Figure 7:
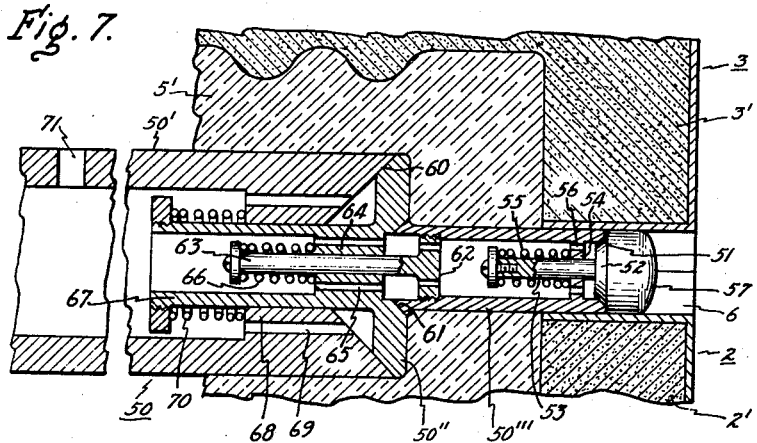

Nov. 17, 1959  E. E. THUENER ET AL  2,912,739
METHOD AND APPARATUS FOR MANUFACTURING CERAMIC INSULATOR SHAPES
Filed Nov. 30, 1955  2 Sheets-Sheet 1
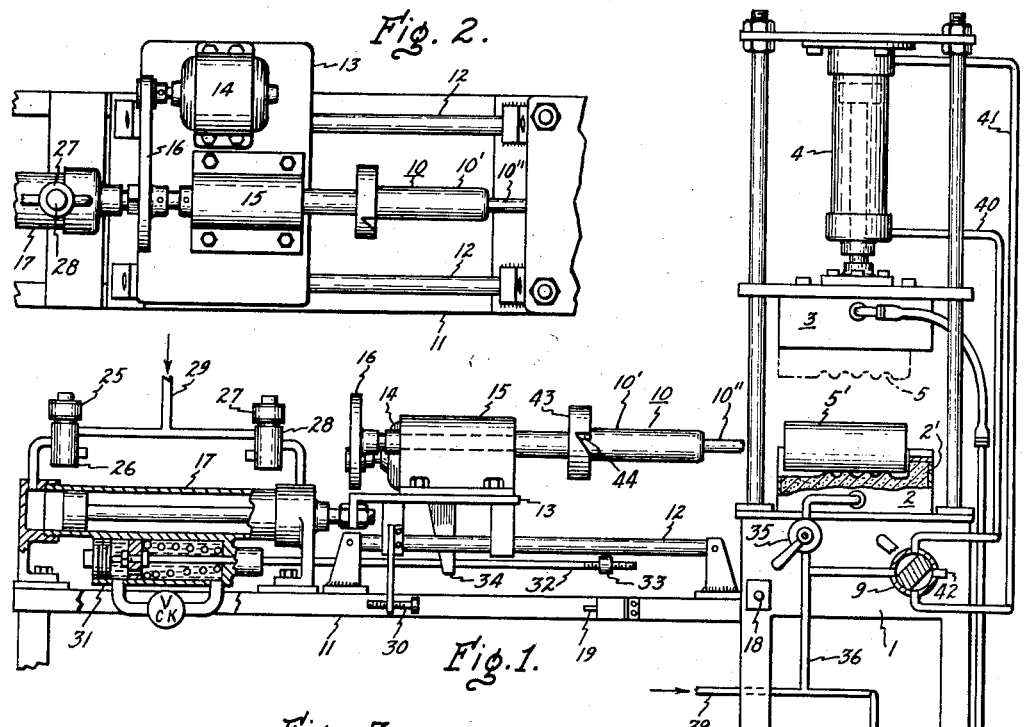
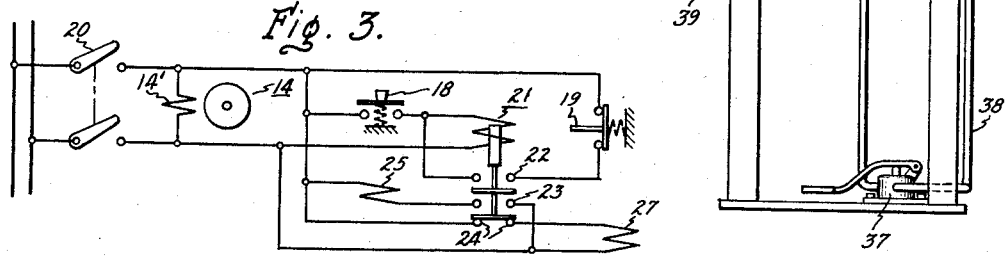
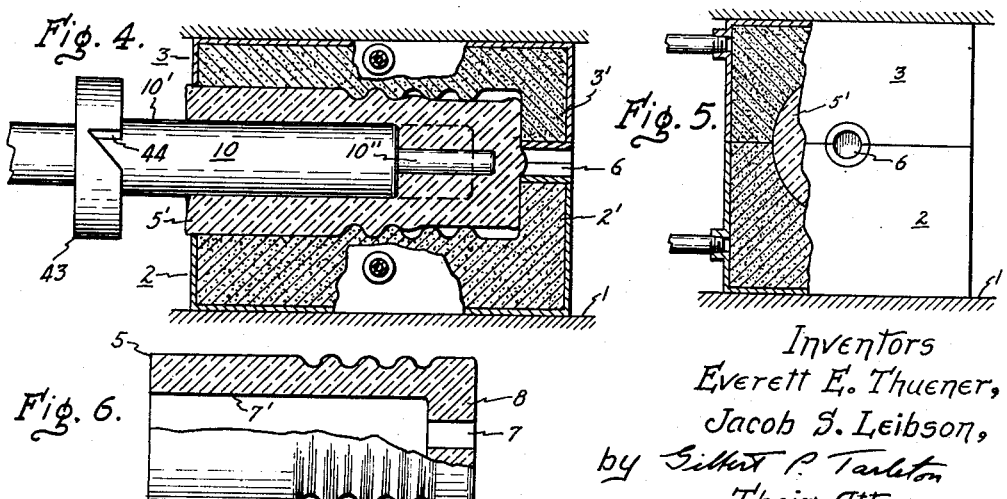
Inventors
Everett E. Thuener,
Jacob S. Leibson,
by Gilbert P. Tarleton
Their Attorney.

Nov. 17, 1959 E. E. THUENER ET AL 2,912,739
METHOD AND APPARATUS FOR MANUFACTURING CERAMIC INSULATOR SHAPES
Filed Nov. 30, 1955 2 Sheets-Sheet 2

Inventors
Everett E. Thuener,
Jacob S. Liebson,
by Gilbert P. Tarleton
Their Attorney.

United States Patent Office 2,912,739
Patented Nov. 17, 1959

2,912,739
METHOD AND APPARATUS FOR MANUFACTURING CERAMIC INSULATOR SHAPES

Everett E. Thuener and Jacob S. Leibson, Schenectady, N.Y., assignors to General Electric Company, a corporation of New York Application November 30, 1955, Serial No. 550,042

5 Claims. (Cl. 25—22)

This invention relates to a method and apparatus for manufacturing ceramic insulator shapes. It is believed that our invention may be applicable to the manufacture of articles other than ceramic pieces. However, for purposes of best illustrating our invention our method and apparatus is illustrated in its applicability to the manufacture of ceramic insulator shapes.

One prior art form of ceramic insulator shape comprises a generally cylindrical elongated ceramic member. The member is open at one end thereof and partially closed at the other end thereof by an apertured end wall. The aperture formed in the end wall is aligned with the axis of the ceramic member and communicates with a larger bore formed in the main body portion of the ceramic member. The large bore extends from the apertured end wall to the opposite open end of the ceramic member. The exterior surface of the ceramic member has circumferentially extending corrugations or scalloped portions formed therein.

One present method of forming the above described ceramic insulator shape is to first form a small axially aligned through bore in a solid cylindrical ceramic blank. The diameter of the axial through bore is made equal to the desired diameter of the aperture present in the end wall of the finished insulator. After the cylindrical blank has been axially bored the main body portion of the cylindrical blank has a larger bore formed therein, however, this larger bore does not extend completely through the cylindrical blank whereby an end wall is defined about the remaining portion of the previously formed small axial bore. The outer surface of the cylindrical blank is corrugated or crenelated by machining. Inasmuch as the above described method requires several machining operations and said machining operations cannot be accelerated too rapidly the rate of production per hour is rather low and the unit manufacturing cost is rather high.

An extrusion method could be used to form the small axial bore which is identical in diameter to the desired end wall opening. However, with the extrusion method it is very difficult to get sufficient compacting pressure near the center of the end wall so that this is an area of weakness. Prior practice has shown that satisfactory units can be made by the extrusion method only if there is a large opening in the end wall so as to eliminate the central area of weakness in the end wall.

Another method which could be used in the manufacture of the above described ceramic insulator shape is a casting method. However, as will be obvious to those skilled in the art a casting method results in a rather low rate of production per hour and rather high unit production cost inasmuch as considerable time is necessary for setting of the casting slip.

Accordingly, it is an object of this invention to provide a method and apparatus for manufacturing ceramic insulators having shapes similar to the above described ceramic insulator shape which will give a higher rate of production per hour and a lower unit production cost than attainable with prior art manufacturing methods and apparatus.

It is a further object of this invention to provide a high hourly rate of production and low unit production cost method and apparatus for forming hollow shapes which are open at opposite portions thereof.

It is a further object of this invention to provide a high hourly production rate and low unit production cost method and apparatus for manufacturing hollow shapes which are open at one portion thereof and closed at an opposite portion thereof.

Our invention comprises a method of forming hollow shapes comprising placing a quantity of material between two mold parts, forcing a rotary member into said material to force the same against the interior surfaces of said mold parts and at the same time form a hollow bore therein, withdrawing said member from said material, separating one of said mold parts and said material while same is supported by the other of said mold parts, and then separating said other mold part and said material.

Our invention further comprises a method of forming a hollow shape which is open at opposite portions thereof comprising positioning a quantity of material within a mold cavity which is open at opposite portions thereof and then forcing a member which is rotating with respect to said material into said material to force the same against the interior surfaces of said mold cavity and at the same time form a hollow cavity in said material.

Our invention further comprises a method of forming a hollow shape which is open at opposite portions thereof comprising placing a quantity of material within a mold cavity which is partially closed at one portion thereof by an apertured wall portion and then forcing a member which is rotating with respect to said material into said material to force the same against the interior surfaces of said mold cavity and apertured wall portion and at the same time form a hollow cavity in said material.

Our invention further comprises a manufacturing apparatus having cooperable mold parts defining a generally horizontally disposed mold cavity open at opposite portions thereof, means for opening and closing said mold parts, a generally horizontally disposed rotary forming element aligned with said mold cavity, and means for moving said forming element into and out of said mold cavity.

Our invention further comprises a manufacturing apparatus having upper and lower porous mold halves defining a generally horizontally disposed porous mold cavity which is open at one portion thereof and partially closed at an opposite portion thereof by an apertured wall portion, pneumatic means connected to said porous mold halves and means for opening and closing said mold halves, a generally horizontally disposed rotary forming and compacting plunger aligned with said mold cavity, and means for moving said plunger into and out of said mold cavity.

The features of our invention which we believe to be novel are set forth with particularity in the appended claims. Our invention itself, however, both as to its organization and method of operation, together with further objects and advantages thereof, may best be understood by reference to the following description taken in connection with the accompanying drawings.

Figure 8:
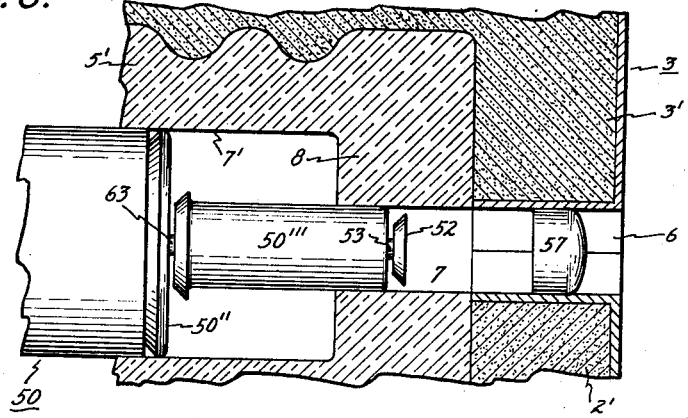

In the drawings Fig. 1 is a partly broken away side view of one form of our invention. Fig. 2 is a partly broken away top view of the apparatus of Fig. 1. Fig. 3 is a diagrammatic illustration of the electrical controls provided for the apparatus of Fig. 1. Fig. 4 is a partly broken away side view of the two porous mold halves and rotary plunger of the apparatus of Fig. 1 illustrating how the plastic ceramic material is compacted against the interior surfaces of the mold cavity and mold cavity apertured end wall by the plunger while simultaneously forming the hollow cavity of the formed piece. Fig. 5 is a partly broken away right-hand end view of the apparatus shown in Fig. 4. Fig. 6 is a partly broken away side view of the finally formed ceramic electrical insulator shape. Fig. 7 is a partly broken away side view of a second form of plunger at the end of its compacting stroke, and Fig. 8 is a similar view of said second plunger form during its retracting stroke. Like reference numerals will be used throughout the various Figures to indicate identical elements.

Referring now to Fig. 1 of the drawings, illustrated therein is an apparatus comprising a table 1 having a lower mold half 2, an upper mold half 3, and a compressed air actuator 4 mounted thereon. The lower mold half 2 rests upon the upper surface of table 1 and the upper mold half 3 is carried by the piston rod of the actuator 4 and is movable toward and away from the lower mold half 2 by the actuator 4. Referring now to Fig. 4, the mold halves 2 and 3 are porous and may be constructed from a permeable material such as plaster of Paris. In their closed position the mold halves 2 and 3 define a porous mold cavity which is open at its left-hand end when viewing Fig. 4 and partially closed at its right-hand end by apertured wall portions 2' and 3' of the mold halves 2 and 3 respectively. The exterior of the mold halves 2 and 3 as well as the apertured portion of the wall portions 2' and 3' have metallic linings thereon. The interior surfaces of the mold cavity conform or correspond to the external surfaces of the ceramic insulator shape desired to be formed such as illustrated by the finally formed ceramic electrical insulator shape 5 shown in Fig. 6. The diameter of the aperture 6 formed in the right-hand end wall of the mold cavity is about equal to the diameter of the aperture 7 formed in the right-hand end wall 8 of the finished insulator 5. The mold cavity defined by the two closed mold halves 2 and 3 is generally cylindrical and elongated in outline and has its lengthwise axis horizontally disposed. The left-hand end opening as well as the right-hand end opening 6 of the mold cavity are concentrically aligned with respect to the lengthwise axis of the mold cavity.

The means for controlling lowering and raising of the mold part 3 with respect to the mold part 2 comprises a valve 9. In the illustrated position of valve 9 compressed air is conducted by the valve 9 from a conduit 39 to a conduit 40 and thence to the lower end of actuator 4. Simultaneously the upper end of the actuator 4 is exhausted by the valve 9 to the atmosphere by a conduit 41 and atmospheric valve opening 42. Accordingly, in the illustrated position of valve 9 the upper mold part 3 is retained in its raised position. To lower the mold part 3 the valve element of the valve 9 must be rotated approximately 90° from its illustrated position. This connects the line 39 to the line 41 and the upper end of actuator 4 and connects the lower end of actuator 4 and conduit 40 to the atmosphere at atmospheric opening 42.

In starting a plunging or forming operation a solid cylindrical elongated plastic ceramic blank 5' is first positioned in the lower mold half 2 and then the upper mold half 3 is lowered into contact with the lower mold half 2. In our invention the solid but deformable plastic blank 5' is not pressed or formed into the shape 5 when the mold halves 2 and 3 are closed. At this stage the mold halves 2 and 3 only define a mold cavity within which the horizontally positioned blank 5' is disposed. As will be explained in greater detail hereinafter, forming and compacting of the blank 5' into the shape 5 is accomplished by forcing a horizontally disposed rotary plunger 10 into the blank 5' which forces and compacts the ceramic material of blank 5' against the interior surfaces of the mold cavity and the right-hand end wall of the mold cavity and simultaneously forms the interior surfaces of the hollow cavity of the formed piece.

Positioned in front of the table 1 is a bed 11 having a pair of guides 12 thereon. Movable along the guides 12 towards and away from the table 1 is a pneumatically actuated carriage 13. Carriage 13 has an electrical motor 14 and a bearing block 15 for the rotary spindle or plunger 10 mounted thereon. Rotary motion is imparted to the spindle or plunger 10 by the motor 14 by virtue of a belt coupling 16 therebetween. The spindle or plunger 10 is moved to and from the table 1 by a pneumatic or compressed air actuator 17 which is positioned on the left-hand end of table 11. The table or carriage 13 is connected to the piston rod of actuator 17 and forward travel of table 13 towards bed 1 is initiated by depression of a control button 18 mounted on table 1. Reverse travel of carriage 13 away from table 1 is initiated by depression of a control button 19 mounted adjacent to button 18 but on bed 11.

Referring now also to Fig. 3, when a switch 20 is closed the electrical windings 14' of motor 14 are energized whereby spindle or plunger 10 is caused to rotate. Depression of button 18 results in energization of solenoid coil 21 and closure of contacts 22 and 23 and opening of contacts 24. The solenoid coil 21 will remain in an energized condition even though button 18 is released because of then closed contacts 22. Closure of contacts 23 results in energization of a solenoid coil 25 whereby a two-way valve 26, see Fig. 1, is actuated to a condition for connecting the left-hand end of actuator 17 to a line 29 of compressed air. The valve 26 is normally spring-biased to an atmospheric exhaust condition whereby when the solenoid coil 25 is de-energized the left-hand end of actuator 17 is exhausted to the atmosphere. Opening of the contacts 24 results in de-energization of a solenoid coil 27 associated with a two-way valve 28, see Fig. 1, similar to the two-way valve 26. When the solenoid coil 27 is de-energized the valve element of valve 28 is spring-biased to an atmospheric exhaust condition whereby the right-hand end of actuator 17 is exhausted to the atmosphere. Entry of compressed air into the left-hand end of actuator 17 and exhausting of the right-hand end of actuator 17 to the atmosphere causes forward travel of the carriage 13 and the spindle or plunger 10 towards the bed 1. At the end of forward or right-hand movement of the carriage 13 the plunger or spindle 10 will have forced its way into the blank 5' and forced the material thereof against the interior surfaces of the mold cavity and apertured end wall defined by closed mold halves 2 and 3 whereby the blank 5' is formed and compacted into the final shape 5 illustrated in Fig. 6. At the end of forward movement of spindle 10 an adjustable member 30 carried by the carriage 13 will depress control button 19. When the button 19 is depressed the holding circuit for solenoid coil 21 is broken whereby contacts 22 and 23 are opened and contacts 24 are closed. When contacts 23 are opened the solenoid coil 25 for valve 26 is de-energized whereby the valve element for valve 26 is spring-biased to exhaust the left-hand end of actuator 17 to the atmosphere. Closure of contacts 24 results in energization of solenoid coil 27 of valve 28 whereby the valve element of valve 28 is actuated to connect the right-hand end of actuator 17 with the compressed air source line 29. This causes the carriage 13 and spindle or plunger 10 to move in a reverse or left-hand direction. Another forward and reverse cycle of the carriage 13 and plunger 10 is initated by depression of the control button 18.

Disposed beneath and immovably fixed to the stationary cylinder of actuator 17 is a dash pot mechanism comprising an oil-filled cylinder 31 having its opposite ends in communication with each other through a one-way check valve. The one-way check valve permits the flow of oil from the left-hand end of cylinder 31 into the right-hand end thereof, but prohibits oil from traveling from the right-hand end of cylinder 31 into the left-hand end thereof. The cylinder 31 has a piston disposed therein which is spring-biased towards the left-hand end of cylinder 31. The piston within cylinder 31 has an aperture formed therein for the exchange of oil between opposite sides of the piston, and a piston rod 32 connected to said piston extends through the right-hand end of cylinder 31 to a positon beneath carriage 13 in line with the axis of spindle or plunger 10. The right-hand end of piston rod 32 has an adjustable collar 33 thereon which is adapted to be engaged by a projection 34 carried by the carriage 13 during the latter part of the forward stroke of carriage 13 and the forming and compacting rotary member 10. When the projection 34 engages the collar 33 during the latter part of the stroke of forming and compacting element 10 the piston rod 32 as well as the piston connected thereto is simultaneously caused to move in a right-hand direction. This has the effect of causing a dwell or delay in the rate of right-hand travel of the member 10. De-acceleration of the member 10 during the latter part of its forward stroke is desirable in order to ensure proper compacting of the blank 5' against the interior surfaces of the mold cavity and mold cavity apertured end wall. For instance, referring to Fig. 4, it will be seen that the interior surfaces of the mold cavity adjacent the right-hand half thereof are corrugated or scalloped in a manner corresponding to the desired corrugation or scalloped portion on the exterior surface of the final insulator shape 5 shown in Fig. 6. De-acceleration of the member 10 towards the end of forward travel of element 10 within the blank 5' and the mold cavity ensures proper filling and compacting of the blank 5' into the corrugated surfaces of the mold cavity as well as the right-hand end thereof to form a structurely sound apertured end wall such as 8 illustrated in the final insulator shape 5 of Fig. 6. When the adjustable member 30 depresses the reverse button 19 the projection 34 will be moved rearwardly and the spring-biased piston connected to piston rod 32 will be free to move to its extreme left-hand rest position illustrated in Fig. 1. The point at which forward travel of member 10 is caused to be delayed or de-accelerated, if any, can be adjusted by appropriate movement of adjustable collar 33 along the piston rod 32. Also, the length of stroke of the member 10 can be varied by appropriate adjustment of the adjustable member 30 which is adapted to depress the reverse button 19.

After the forming and compacting element 10 is withdrawn a hand operated valve 35 is actuated to force compressed air from conduit 39 through conduit 36 into the lower mold half 2. The injection of compressed air into the lower mold half 2 causes any moisture absorbed thereby from the blank 5' to be driven to the interface between the finally formed insulator 5 and the interior surfaces of the lower mold half 2. Forcing of said absorbed moisture to said interface as well as the presence of said compressed air along said interface causes release or floating away of the finished insulator 5 from the lower mold half 2. Thereafter the valve element of valve 9 is actuated to its illustrated position whereby the hydraulic actuator 4 causes the upper mold half 3 to be raised. When the upper mold half 3 is raised the finished insulator 5 adheres thereto and is supported thereby in the manner illustrated in broken line outline of Fig. 1. Thereafter a foot-operated valve 37 can be actuated to interconnect a conduit 38 with the conduit 39 whereby compressed air is injected into the upper mold half 3 to cause release of the finished insulator 5 therefrom. As the finished insulator 5 drops away from the upper mold half 3 it can be caught by hand or a trough or the like can be positioned beneath the finished insulator 5 preparatory to release thereof from the upper mold half 3. To initiate another manufacturing operation the valves 35 and 37 are actuated to cut off compressed air from the mold halves 2 and 3. Then another blank 5' is positioned in the lower half 2 and the valve element of valve 9 is actuated to cause closure of the mold halves 2 and 3. Thereafter the start and forward control button 18 is depressed to initiate forming of the desired insulator shape by the spindle 10.

It will be noted that the plunger 10 has single step differentially diametered external shape. For instance, a large main portion 10' has an external cylindrical configuration conforming or corresponding to the desired internal configuration of the main bore 7' of the finished insulator 5, and a small portion 10" axially protruding from the leading end of main portion 10' has an external cylindrical configuration conforming or corresponding to the desired internal configuration of the small bore 7 of finished insulator 5. The small portion 10" and small bores 6 and 7 have about equal diameters and during the end of the forward stroke of the plunger 10 the small portion 10" will displace some of the ceramic material of end wall 8 into the small bore 6 and then protrude through small bore 6. The small portion 10" is long enough to protrude into and substantially close small bore 6 before the forming and compacting operation is completed to ensure that the ceramic material is firmly compacted into the right-hand end of the mold cavity so that a structurely sound end wall 8 is formed. It will be understood that the blank 5' comprises a predetermined mass of plastic ceramic material which is at least slightly in excess of the final total volume of the finished insulator 5. At least a slight excess of ceramic material is desirable to obtain complete filling of the mold cavity at the end of the forward stroke of plunger 10 and proper compacting. Excess ceramic material or flash is expelled out of the left-hand end of the mold cavity as well as out of the right-hand end. The left-hand end of plunger 10 has a flange or closure plate 43 thereon which will abut the left-hand end of the mold halves 2 and 3 and close the left-hand end of the mold cavity at the end of forward travel of plunger or ram 10. However, excess ceramic material or flash can escape from the left-hand end of the mold cavity and the left-hand end surface of the plunged insulator 5 is smoothed or finished off by virtue of a tooth-like groove 44 formed in the inner surface of flange 43 which extends radially outward from main portion 10'. The ram 10 is a hard smooth surfaced non-porous metallic member and a drop of oil can be applied thereto to reduce suck or adhesion of the interior surface of insulator 5 to the ram 10 upon withdrawal of ram 10.

The illustrated and preferred form of our invention utilizes a horizontal plunging method and a horizontally disposed ram and mold halves. Acceptable pieces can be formed by using a vertical plunging method and a vertically disposed ram and mold halves. However, it has been discovered that the horizontal arrangement is by far better than the vertical arrangement for repetitively producing high quality defect free ceramic ware, and particularly when said ware has an elongated, corrugated, and hollow shape. When elongated, corrugated, and hollow shaped ware is horizontally disposed the ware is uniformly supported by and released from the upper mold half 3 with no deformation or sagging of the ware. However, when the ware and mold halves are vertically disposed the ware is not as uniformly supported by or released from the last separated mold half and flaws such as marring or sagging are more apt to be introduced in the ware inasmuch as it is still in a plastic condition.

Additionally, though the invention is illustrated in its application to the formation of cylindrical ceramic shapes partially closed at one end thereof by an apertured end wall, our invention is also useful in the forming of cylindrical shapes that are either totally closed at one end thereof or without an apertured end wall but open at both ends thereof.

Our invention requires relative rotation between the plunger and the mass of clay being formed. If there is no relative rotation unsatisfactory pieces are formed since then the plunger does not force its way into the mass of clay very easily and the mass of clay does not flow properly. Relative rotation between the plunger and the mass of clay can be provided by rotating either the plunger or the mold. However, rotating the plunger is the preferred method of obtaining relative rotation since rotating the mold is not too practical due to its mounting and attachments. For the same reason, the plunger is forced into the clay by moving the plunger toward the mold, although it is within the scope of this invention to force the plunger into the clay by moving the mold toward the plunger.

Since relative rotation between the plunger and mass of clay is necessary the invention is restricted to pieces whose internal surfaces will lend themselves to formation by relative rotation between the plunger and mass of clay. However, the invention is not restricted to forming pieces that have cylindrical bores or cavities. For instance, the invention is believed to be applicable to forming pieces having other internal configurations such as conical, screw threaded, or hemispherical cavities by the employment of suitably contoured plungers. In the case of progressively wider cavities such as conical internal surfaces it will be appreciated that the end of the blank corresponding to the wider end of the cavity should be the one that is first contacted by the narrower end of the plunger in order to get proper compacting of the clay and so as to enable withdrawal of the plunger. However, it will be appreciated that greater latitude is permissible in the type of exterior surfaces of the formed pieces. For instance, the external configuration of the piece may be rectangular or box shaped, and this is true even though the mold is rotated instead of rotating the plunger.

Illustrated in Figs. 7 and 8, is a second form of rotating plunger or spindle indicated generally by reference numeral 50. In the spindle 10 the smaller portion 10″ protruded through the aperture 6 at the end of the forming stroke. This was so an operator could remove the small plug of clay that might be stuck to the forward end of portion 10″ lest it be retracted back into the aperture 7 during the withdrawal stroke of plunger 10.

The spindle 50 has automatically operable means to ensure that said small plug is not retracted back into the aperture 7 thereby making it unnecessary to ensure that the smaller portion 10″ protrudes through aperture 6 and rely on the operator to remove said small plug should it stick to smaller portion 10″. Additionally, it will be appreciated that as the spindle 10 is being retracted from the formed piece the spindle and formed piece will tend to stick to each other, even though the spindle is lubricated with oil, due to the fact that the interfacial pressure between the exterior surfaces of the spindle and interior surfaces of the formed piece will be at vacuum or less than atmospheric pressure. In the spindle 50 automatically operable means is provided to break this vacuum during the retracting stroke of the spindle to reduce suck between the spindle and formed piece.

Referring now to Figs. 7 and 8, the spindle 50 is hollow and comprises three main parts 50′, 50″ and 50‴. The nose or front end of part 50‴ has a valve seat 51 formed therein in which a valve element 52 seats. A rod 53 of valve element 52 is guided by a centrally apertured wall 54 formed behind valve seat 51. The valve element 52 is biased to its seated position by a light spring 55 and air vents 56 are formed in wall 54. As will be more clear hereinafter, atmospheric or greater than atmospheric pressure exists within the hollow spindle 50. The rod 53 is spin free in the centrally apertured wall 54. In Fig. 7 the spindle 50 is shown at the extreme end of its compacting stroke and a small plug of clay 57 is illustrated as having been pushed into the mold cavity end wall aperture 6. When the spindle 50 is retracted if the plug 57 adheres to the valve element 52 and tends to be retracted through the aperture 6 into aperture 7 the drag between the plug 57 and aperture 6 will be sufficient to overcome the force of spring 55 and lift valve element 52 off its seat 51. This will result in breaking of the vacuum between the nose of part 50‴ and the valve element 52 and plug 57 whereby plug 57 will not be retracted into the aperture 7.

The nose of part 50′ has a valve seat 60 formed thereon in which the part 50″ which is also a valve element seats. The front of valve element 50″ has a valve seat 61 formed thereon in which the rear end of portion 50‴ seats which operates as a valve element. Formed inside hollow part 50‴ is an air vented rear wall 62 from which extends a rod 63. Rod 63 is guided by a centrally apertured wall 64 formed inside of hollow part 50″. Rod 63 is spin free in wall 64 which means that part 50‴ is spin free also. The wall 64 has air vents 65 formed therein and the part 50‴ is urged rearwardly to seat on its valve seat 61 by a light spring 66. When spindle 50 is withdrawn if there is suck between the exterior surface of part 50‴ and the surfaces of aperture 7 the drag will be sufficient to overcome the force of spring 66 whereby the rear end of part 50‴ will be lifted off valve seat 61. The resulting admission of atmospheric pressure through valve seat 61 and unseated part 50‴ will be effective to break the interfacial vacuum pressure existent between part 50‴ and aperture 7. Unseating of valve element 52 contributes to the breaking of this interfacial vacuum pressure also, and unseating of the rear end of part 50‴ from valve seat 61 is also effective or contributes to breaking of the interfacial vacuum pressure existent between the front face of part 50″ and the inner surface of end wall 8.

The hollow stem 67 of part or valve element 50″ is spin free guided within a centrally apertured wall 68 formed within part 50′ behind the valve seat 60. The wall 68 has air vents 69 formed therein and a light spring 70 causes part 50″ to seat on valve seat 60.

If part 50″ sticks to the end wall 8 the suck therebetween will be sufficient to overcome the force of spring 70 to unseat part 50″ and aid in breaking the vacuum between part 50″ and end wall 8 as well as the vacuum between part 50′ and bore 7′. Atmospheric pressure is present in the interconnected hollow parts 50′, 50″ and 50‴ by virtue of an atmospheric opening 71 formed in part 50′ which is in communication with the air vents formed in the walls 68, 64, 62 and 54. The opening 71 preferably is formed in the spindle 50 behind a collar used therewith similar to the one illustrated by reference numeral 43 of Fig. 4. If so desired slightly greater than atmospheric pressure compressed air could be injected into opening 71 by a suitable control mechanism at the very beginning of the retracting stroke of spindle 50. As will be obvious to those skilled in the art, when the pressure on opposite sides of parts 50″ and 50‴ and valve element 52 is equalized the springs thereof will be effective to reseat the same.

While there have been shown and described particular embodiments of the invention, it will be obvious to those skilled in the art that changes and modifications may be made without departing from the invention, and therefore it is intended by the appended claims to cover all such changes and modifications as fall within the true spirit and scope of the invention.

What we claim as new and desire to secure by Letters Patent of the United States is:

1. A method of manufacturing ceramic hollow elongated electrical insulator shapes comprising horizontally positioning an elongated solid mass of plastic ceramic between horizontally positioned and open but relatively movable upper and lower porous mold surfaces which cooperate when closed to define a mold cavity that is open at one end thereof and partially closed at the other end thereof, closing said porous mold surfaces, forcing a movable horizontally positioned rotating member into said mass from said mold cavity one end toward said mold cavity other end to force and compact said mass against the interior surfaces of said mold cavity and at the same time form a cavity inside said mass, withdrawing said member from said mass, forcing a fluid through said lower porous mold surface, and separating said upper and lower porous mold surfaces while said formed mass is supported by said upper porous mold surface, and then forcing a fluid through said upper porous mold surface to release said formed mass therefrom.

2. A method of manufacturing a ceramic hollow generally cylindrical elongated electrical insulator shape comprising horizontally positioning an elongated predetermined solid mass of plastic ceramic between horizontally positioned and open but relatively movable upper and lower porous and generally semi cylindrical elongated mold surfaces which cooperate when closed to define a mold cavity that is open at one end thereof and partially closed at the other end thereof, closing said porous mold surfaces, forcing a movable horiontally positioned generally cylindrical elongated impervious rotatable member into said mass from said mold cavity one end toward said mold cavity other end to simultaneously form the inside and outside of said shape, withdrawing said member from said mass, forcing a fluid through said lower mold surface, and separating said upper and lower mold surfaces while said formed mass is supported by said upper porous mold surface, and then forcing a fluid through said upper porous mold surface to release said formed mass therefrom.

3. A manufacturing apparatus having relatively movable upper and lower porous mold halves which in their closed position define therebetween a generally horizontally disposed mold cavity which is open at one portion thereof and partially closed at an opposite portion thereof by an apertured wall portion of said mold halves, pneumatic means connected to said porous mold halves and means for opening and closing said mold halves, a movable generally horizontally disposed forming and compacting rotary plunger aligned with said mold cavity, and means for moving said plunger into and out of said mold cavity.

4. A manufacturing apparatus having relatively movable upper and lower porous generally semi cylindrical mold parts, said mold parts in their closed position defining a generally horizontally disposed and elongated cylindrical mold cavity which is open at one end thereof and partially closed at another end thereof by an end wall portion of said mold parts, said end wall portion in said mold parts closed position having a circular aperture therein which is axially aligned with the lengthwise axis of said mold cavity, means for forcing compressed air through said mold parts and means for opening and closing said mold parts, a movable generally horizontally disposed and elongated cylindrical rotary spindle, said spindle being axially aligned with the lengthwise axis of said cavity, the outer diameter of said spindle being substantially less than the inner diameter of said cavity, a leading end of said spindle having an axially aligned cylindrical projection thereon which is similar in outer diameter to the diameter of said circular aperture, and means for moving said spindle into said cavity until said projection enters said aperture while said leading end is still spaced from said end wall portion and then withdrawing said spindle from said cavity.

5. A method of manufacturing a hollow elongated ceramic shape comprising positioning a mass of plastic ceramic in a generally horizontally disposed elongated mold cavity which is defined by relatively movable upper and lower porous mold halves, forcing a movable generally horizontally disposed rotary member into said mold cavity to simultaneously form and compact said mass whereby said mass adheres to said mold halves, forcing a fluid through said lower mold half to release said mass therefrom and raising said upper mold half, and then forcing a fluid through said upper mold half to release said mass therefrom.

References Cited in the file of this patent
UNITED STATES PATENTS

| | | |
|---|---|---|
| 1,337,618 | Pipe | Apr. 20, 1920 |
| 1,429,459 | Schol | Sept. 19, 1922 |
| 1,592,536 | O'Neill | July 13, 1926 |
| 1,637,707 | Porter | Aug. 2, 1927 |
| 1,745,827 | Ashton | Feb. 4, 1930 |
| 1,823,180 | White et al. | Sept. 15, 1931 |
| 2,130,254 | Visman | Sept. 13, 1938 |
| 2,395,295 | Rowland | Feb. 19, 1946 |
| 2,399,592 | Bradshaw | Apr. 30, 1946 |
| 2,442,338 | Borkland | June 1, 1948 |
| 2,632,227 | Steele et al. | Mar. 24, 1953 |
| 2,818,628 | Steele et al. | Jan. 7, 1958 |